Aug. 1, 1950  J. F. PLUMMER, JR  2,517,236
BLANCHING DEVICE FOR FOOD PROCESSING APPARATUS
Filed July 8, 1947
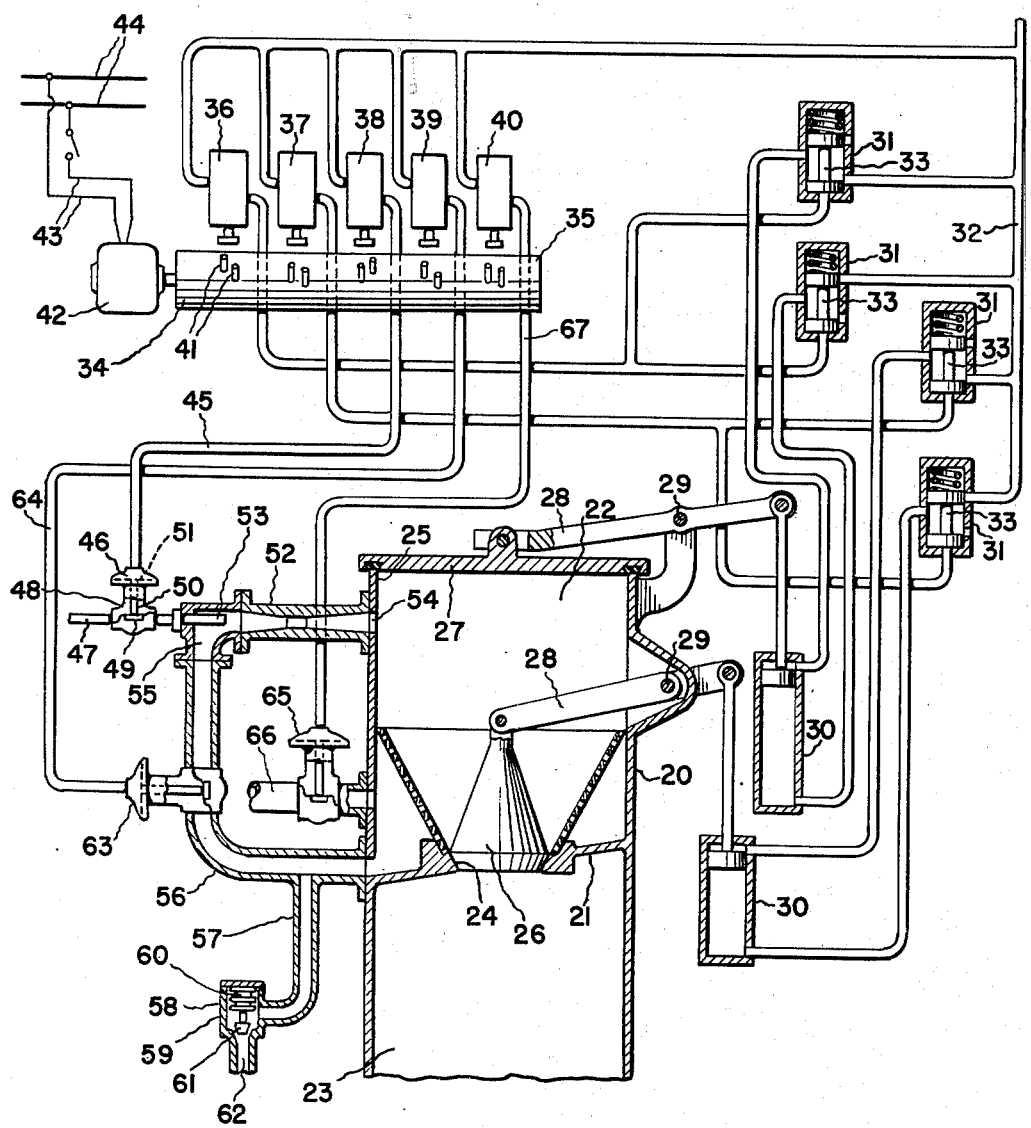
INVENTOR
JOHN F. PLUMMER, JR.
BY
HIS ATTORNEY.

Patented Aug. 1, 1950

2,517,236

UNITED STATES PATENT OFFICE 2,517,236

BLANCHING DEVICE FOR FOOD PROCESSING APPARATUS

John F. Plummer, Jr., Phillipsburg, N. J., assignor to Ingersoll-Rand Company, New York, N. Y., a corporation of New Jersey Application July 8, 1947, Serial No. 759,539

2 Claims. (Cl. 99—271)

This invention relates to food processing apparatus, and more particularly to a blanching device for apparatus of that type.

One object of the invention is to enable the blanching medium to be brought into intimate contact with all of the particles of a food charge.

A more specific object is to effect the removal of air from the blanching chamber preparatory to the beginning of a blanching period.

Other objects will be in part obvious and in part pointed out hereinafter.

The figure in the accompanying drawing is a diagrammatic view of a blanching device constructed in accordance with the practice of the invention and a portion of a food processing apparatus to which it is applied.

Referring more particularly to the drawing, the invention is shown applied to a food processing apparatus of the type disclosed in United States Patent No. 2,407,482 to F. B. Doyle, September 10, 1946, and which includes a casing 20 having a transverse wall 21 to divide the interior thereof into a blanching chamber 22 and a freezing chamber 23, only a portion of the latter being shown.

The wall 21 has an opening 24 through which the food is discharged from the blanching chamber into the freezing chamber, and at the upper end of the casing is an inlet opening 25 for the introduction of food material into the blanching chamber. Closures are provided for the openings 24 and 25, respectively, in the form of a valve 26 and a plate 27 that are attached pivotally to levers 28 which rock on pins 29 supported by the casing 20.

The valve 26 and the cover 27 are actuated by reciprocatory motors 30 connected to the levers 28, and the flow of pressure fluid to and from the motors is controlled, in part, by valve mechanisms 31 to which pressure fluid is conveyed for distribution to the motors 30 by a supply conduit 32. The valve elements 33 of the mechanisms 31 are spring actuated to one limiting position and to the other limiting position by pressure fluid to cause operation of the valve 26 and the cover 27 in the correct sequence and in correctly timed relation with the beginning and ending of a blanching period.

The means shown for thus controlling the movements of the valve 26 and the cover 27 consists of a time cycle controller 34 of the type disclosed in United States Patent No. 2,272,237 to W. J. Brown et al. and which, described briefly herein, comprises a rotary drum 35 for actuating a series of relay valves 36, 37, 38, 39 and 40. These valve mechanisms lie along the side of the drum within reach of the usual stops 41 carried by the drum for actuating their valve elements.

The stops 41 are adjustable peripherally of the drum 35 to effect a desired opening and closing of the valve elements of the valve mechanisms 36 to 40 and may be of such numbers as to cause the repeated operation of the valve mechanisms 36 to 40 during a complete cycle of rotation of the drum, if required. The drum 35 is driven by a motor 42 to which electric current is conveyed by wires 43 leading from a main 44.

In the arrangement shown, the valve mechanism 36 controls the admission of pressure fluid to the pair of valve mechanisms 31 controlling the movements of the plate 27, and the valve mechanism 37 performs a similar function for the valve mechanism 31 associated with the motor 30 of the valve 26. The admission and cut-off of blanching medium, steam for example, to and from the blanching chamber is controlled by the valve mechanism 38 which is connected, by a conduit 45, with a valve mechanism 46 in a conduit 47 leading from a source of steam (not shown).

The valve mechanism 46 is indicated as being of the well known diaphragm type comprising a casing 48 and a valve element 49 having a stem 50 which may be connected, in any suitable manner, to a flexible diaphragm 51 against which the pressure fluid acts for unseating the valve element 49.

In order to cause the re-circulation of the steam supplied to the blanching chamber, the steam flowing from the conduit 47 is directed through a jet ejector 52 the nozzle 53 of which constitutes the outlet end of the conduit 47. The ejector 52 communicates with the upper portion of the blanching chamber 22 through a port 54 and its suction chamber 55 communicates with the lower portion of the blanching chamber through a conduit 56 so that steam issuing from the ejector will sweep through the entire length of the blanching chamber and pass through the conduit 56 to the ejector to be again introduced into the blanching chamber.

To the end that the air admitted into the blanching chamber during the charging thereof may be expelled at the beginning of each blanching period, said chamber is provided with an atmospheric vent shown in the present instance as a conduit 57 connected to the conduit 56 and to the casing 58 of a thermostatic trap 59. The trap 59 is of a known type including a thermostat 60 carrying a valve 61 which controls communication between the conduit 57 and an atmospheric port 62 in the casing 58.

In order to prevent the re-entry of air into the blanching chamber with the blanching steam the conduit 56 is provided with a diaphragm valve mechanism 63 the valve element of which normally occupies the closed position. The pressure fluid serving to unseat the valve element of the valve mechanism 63 is conveyed thereto by a conduit 64, and the flow of pressure fluid into and from said conduit is controlled by the valve mechanism 39 of the time cycle controller.

The remaining valve mechanism 40 controls the supply of pressure fluid for a diaphragm valve 65 interposed in a conduit 66 leading from the lower portion of the blanching chamber to a suitable evacuator (not shown) serving to evacuate the blanching chamber 22 after each blanching period to pre-cool the food material before discharging it into the freezing chamber 23. The valve element of the diaphragm valve 65 also normally occupies a closed position and is unseated by pressure fluid conveyed thereto by a conduit 67 leading from the valve mechanism 40, such pressure fluid being valved into and from the conduit 67 in suitably timed relation with the ending of a blanching period.

In the operation of the device, let it be assumed that the drum 35 is in motion and that the motors 30 and the elements controlling them, including the valve mechanisms 36—37, are in the positions required for holding the valve 26 and the cover 27 in the closed positions. A stop 41 will then actuate the valve mechanism 38 to valve pressure fluid to the diaphragm valve 46 for unseating its valve element. Thereupon, steam will flow through the ejector 52 into the blanching chamber and expel the air through the conduits 56—57 and the discharge port 62 to the atmosphere. When the steam reaches the thermostat 60 the latter will be extended and move the valve 61 into position to cut-off communication between the blanching chamber and the atmosphere.

Immediately after the valve 61 has been closed a stop 41 shifts the valve mechanism 39 and pressure fluid will flow to the diaphragm valve 63 and unseat it. The conduit 56 will then be open and steam will flow from the lower end of the blanching chamber through the conduit 56 to the ejector and again pass therethrough into the blanching chamber. In this way the steam is re-circulated through the batch of food material and at the ending of a blanching period, and which is determined by the angle through which the drum 35 rotates, a stop 41 will again shift the valve element of the mechanism 38 to its initial position for exhausting pressure fluid from the diaphragm valve 46 to cut-off the flow of steam to the blanching chamber.

At the same time a stop 41 will return the valve element of the mechanism 39 to its initial position to exhaust the pressure fluid from the diaphragm valve 63 which will then assume its closed position preparatory to the evacuation of the blanching chamber at the beginning of the succeeding blanching period. The valve element of the mechanism 40 is then also actuated to valve pressure fluid to the valve mechanism 65 for opening the conduit 66 to connect the blanching chamber with an evacuator for pre-cooling the food charge before it passes to the freezing chamber 23.

As will be readily appreciated from the foregoing description, by thus forcing the air from the blanching chamber at the beginning of a blanching period and re-circulating the steam, the steam will have free access to all portions of the blanching chamber and will be brought quickly into intimate contact with all the surfaces of the food particles and the step of blanching may, therefore, be carried out with a minimum consumption of steam. A further highly desirable advantage of the invention is that any elements of nutritive value that may become separated from the food particles and entrained in the steam and such small amounts of condensate as may form within the blanching chamber will again be sprayed over the food charge to pass therewith to the freezing chamber.

I claim:

1. In a blanching device for food processing apparatus, a casing having a blanching chamber, means for supplying blanching medium to the chamber, means for causing the re-circulation of blanching medium in the blanching chamber, means for venting the blanching chamber to the atmosphere at the beginning of a blanching period, and means acting in timed relation with the beginning of flow of blanching medium into the blanching chamber to prevent the re-circulation of blanching medium for a predetermined period of time to permit the expulsion of air from said chamber through the venting means to the atmosphere.

2. In a blanching device for food processing apparatus, a casing having a blanching chamber, a jet ejector for introducing blanching medium into the blanching chamber, a conduit affording communication between the blanching chamber and the suction side of the ejector to permit the withdrawal of blanching medium from the blanching chamber and its re-introduction into the stream flowing through the jet ejector into the blanching chamber, means defining a passage for venting the blanching chamber to the atmosphere, thermo-responsive means for controlling the passage, a valve for controlling the conduit, and means for causing movement of said valve to its open position in timed relation with the beginning of flow of blanching medium into the blanching chamber.

JOHN F. PLUMMER, Jr.

REFERENCES CITED

The following references are of record in the file of this patent:

UNITED STATES PATENTS

| Number | Name | Date |
|---|---|---|
| 914,302 | Nenninger | Mar. 2, 1909 |
| 1,437,840 | Grondal | Dec. 5, 1922 |
| 1,668,591 | Hoyt | May 8, 1928 |